(12) United States Patent
Lee

(10) Patent No.: US 6,377,176 B1
(45) Date of Patent: Apr. 23, 2002

(54) METAL COMPENSATED RADIO FREQUENCY IDENTIFICATION READER

(75) Inventor: Donny V. Lee, North Port, NY (US)

(73) Assignee: Applied Wireless Identifications Group, Inc., Monsey, NY (US)

(*) Notice: Subject to any disclaimer, the term of this patent is extended or adjusted under 35 U.S.C. 154(b) by 0 days.

(21) Appl. No.: 09/846,563

(22) Filed: Apr. 30, 2001

Related U.S. Application Data

(62) Division of application No. 09/592,715, filed on Jun. 13, 2000.

(51) Int. Cl.[7] .............................................. H04Q 1/00
(52) U.S. Cl. ................................. 340/572.1; 340/825.54
(58) Field of Search ................................. 343/702, 741, 343/742, 788, 866, 867, 895; 235/381; 340/572.1, 572.2, 572.6, 825.54, 825.69

(56) References Cited

U.S. PATENT DOCUMENTS

| | | | |
|---|---|---|---|
| 5,767,789 A | * 6/1998 | Afzali et al. | 340/825.54 |
| 5,786,626 A | * 7/1998 | Brady et al. | 257/673 |
| 5,963,132 A | * 10/1999 | Yoakum | 340/572.1 |
| 6,195,053 B1 | * 2/2001 | Kodukula et al. | 343/702 |
| 6,201,474 B1 | * 3/2001 | Brady et al. | 340/572.8 |
| 6,236,316 B1 | * 5/2001 | Eberhardt et al. | 340/572.7 |

* cited by examiner

Primary Examiner—Tho Phan
(74) Attorney, Agent, or Firm—Salzman & Levy

(57) ABSTRACT

The present invention features an improved radio-frequency identification (RFID) reader which operates with a low power consumption and which may tolerate a wide fluctuation in input voltages. The RFID reader is housed so that the influence of its physical surroundings, especially metallic objects, on system performance is minimized. A pre-compensation metal plate is used to stabilize the self-resonant frequency of the reader, even in the presence of large metal masses. The pre-compensation plate may be formed from aluminum or another non-ferrous material or, for long-range RFID readers, from ferrite or another similar, high magnetically permeable material. In addition, the RFID reader features improved sensitivity so that the effective operating distance is maximized. Also, the operating frequency is dynamically controlled in discrete steps of 10 Hz or less so that the effects of component parameter drift, temperature change, or other external factors are minimized. The RFID reader also automatically adapts itself to the requirements of an external access control system to which it is attached.

7 Claims, 2 Drawing Sheets

METAL COMPENSATED RADIO FREQUENCY IDENTIFICATION READER

This application is a division of appln Ser. No. 09/592,715 filed Jun. 13, 2000.

FIELD OF THE INVENTION

The present invention relates to radio frequency identification (RFID) apparatus and, more specifically, to a low voltage, low power, metal compensated RFID reader.

BACKGROUND OF THE INVENTION

Radio Frequency Identification (RFID) is a means of using radio frequency (RF) electromagnetic waves to identify objects that carry identifying transponders. This identification technology is similar to bar-code technology. However, instead of using light beams, RFID uses RF electromagnetic waves. Each RFID system consists of at least one RFID reader and, usually, many transponders. During its normal operation, the RFID reader transmits an electromagnetic wave to "illuminate" a target transponder. The transponder responds by selectively reflecting that electromagnetic wave, thereby causing an electromagnetic field disturbance. This field disturbance is interpreted by the RFID reader to reveal the transponder identity and other preprogrammed information stored in the transponder. This process is called back-scatter, selectively reflecting the illuminating electromagnetic waves by changing the energy absorption characteristic of the transponder, thereby creating a field disturbance that can be sensed by the reader's antenna.

There are two main categories of RFID systems: active RFID and passive RFID. Active RFID refers to transponders that are powered by an on-board power source (e.g., a battery, etc.). Passive RFID systems utilize transponders that do not have their own internal power source but rather rely on the transmitted radio waves for self-energization. RFID transponders may have sophisticated designs and usually consist of an antenna, an RFID IC chip, and sometimes an internal or external resonating capacitor. The IC usually stores several kilo-bits of data. Some ICs are read only, some are one-time-programmable (OTP) and some have read/write functions constructed with non-volatile memories such as EEPROM (electronically erasable and programmable read only memory) or FeRAM (Ferromagnetic random access memory). Unlike bar-code labels, RFID transponders are nearly impossible to copy or duplicate. Also unlike bar-code readers, RFID systems can function well in environments containing dust, dirt, grime, oil, snow, darkness, and high humidity. In addition, RFIDs can read or read/write in non-line-of-sight applications, through clothing, wood and nonmetallic materials. These features allow RFIDs to displace bar-code systems in many commercial and industrial applications.

Currently, many models of RFID readers and transponders are made by several different manufacturers. These devices are generally designed to operate in one of four frequency ranges: low frequency (approximately 125 kHz), high frequency (approximately 13.56 MHz), ultra-high frequency (approximately 915 MHz) and microwave (approximately 2450 MHz). Each of these frequency ranges is suitable for different applications. Low frequency readers are used in access control applications, and high frequency readers are used as smart card readers for merchandise source tagging and electronic article surveillance (EAS) applications or electronic money exchange. UHF and microwave readers are used for longer distance and higher data rate asset tracking and asset management applications.

The present invention applies primarily to low frequency 125 kHz access control RFID readers, and primarily for access control applications.

Low frequency RFID readers are basically magnetically coupled devices. When used for access control, the readers are usually installed at the entrances of buildings to control the opening and closing of doors or gates. Typically, short-range (less than 8 inches) readers are for door controls and long-range (greater than 15 inches) readers are for gate controls. During installations, short-range readers are often mounted on drywalls or metal door frames, while long-range readers are often mounted on exterior walls, steel posts or metallic surfaces. Mounting the reader close to a metallic object always degrades the reader's read range. It is not unusual for a short-range reader with a nominal 4–6 inch read range to be mounted on a metal mullion, leaving only a 2–3 inch read range. In the case of long-range readers, the impact is even more severe. Sometimes a 24-inch reader may exhibit less than an 8 inch read range after mounting on a steel column or metallic wall.

A low frequency RFID system relies on reader-to-transponder resonant coupling to transfer energy from the reader to the transponder, and from the transponder back to the reader. Matching the reader's self-resonant output frequency to the reader's excitation frequency is therefore a major factor determining the reader's performance. This frequency match accuracy must be maintained during the production, installation and operation phases of the RFID reader.

Three factors affect the accuracy of the reader's self-resonant circuit: basic component tolerances, consistency during production, and immunity to outside interference during installation and operation of the device.

Controlling component tolerances during production is generally a simple matter of selecting components with tight component tolerances, both initially and at end-of-life. Because RFID readers may be located in hostile environments, choosing components capable of operating reliably and consistently in these environments is also important.

Controlling the self-resonating frequency during production is a different matter. The readers are usually potted to provide protection for the electronic circuits and to provide security. Controlling the potting operation is important because, without careful controls, the potting process itself can affect the self-resonant frequency.

The choice of potting material is important. The dielectric constant of a typical potting compound is generally between 3 to 4, making it quite different from that of air, which is 1. When the potting compound comes in contact with the antenna coil, it increases the inductance of the antenna coil, thereby causing an undesirable downward shift in the resonant frequency. Potting compounds are generally two-part chemicals whose dielectric constant depends on the mixing ratio, the blending process and the cure rate. Since it is hard to control the mixing, blending and curing process, maintaining the consistent self-resonant frequency during potting can be difficult.

A third factor that affects the reader's performance is the installation environment, which is often uncontrollable. Readers may be mounted on drywall, on cement walls, on brick walls and or on metal columns or metal mullions. Since the mounting environment can not be controlled, a means to immunize the reader from the adverse effect of metal mounting becomes necessary.

The last factor that may affect reader performance during operation is the installation process. Most access control readers are connected to an access control panel. This panel has the memory capacity to store all potential identification codes and the capability to interface to a PC or other controller. In addition, the control panel generally includes the system power supply and the necessary circuitry to control door strikes which lock or release the doors. The access control panel is typically located at a central location to control more than one door or gate. This means there may be a significant distance between the reader(s) and the control panel. Potential performance problems may be introduced by long cable runs.

The copper wire size (AWG) that carries the power from the panel to the readers is important. In the RFID reader installation of the prior art, the simplest solution to this problem was to use an oversize wire which generally resulted in both higher material costs and higher labor costs.

It is therefore an object of the invention to provide an RFID reader which operates at a low power consumption and which can tolerate widely varying power supply voltages, with the ability to operate at very low input supply voltages.

It is a further object of the invention to provide an RFID reader which utilizes circuit designs to maximize self-resonant frequency stability.

It is an additional object of the invention to provide an RFID reader manufactured in a manner that also maximizes reader self-resonant frequency stability.

It is another object of the invention to provide an RFID receiver having improved sensitivity to increase the effective operational distance between the receiver and a transponder.

It is a still further object of the invention to provide an RFID reader having metal pre-compensation and post compensation to allow the reader to be mounted directly on a metal surface while retaining most of its read range.

It is yet another object of the invention to provide an RFID reader utilizing a metal compensation technique which shapes the flux field to make it substantially unidirectional.

It is a still further object of the invention to provide an RFID having means for automatically adapting to the interface requirements of an access control system to which it is interfaced.

SUMMARY OF THE INVENTION

In accordance with the present invention, there is provided an improved RFID reader which operates at a low power consumption and which may tolerate widely fluctuating input voltages. The RFID reader of the invention is housed so that the influence of its physical surroundings on system performance is minimized. In addition, the inventive RFID reader features improved sensitivity so that the effective operating distance is maximized.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Figure 1:
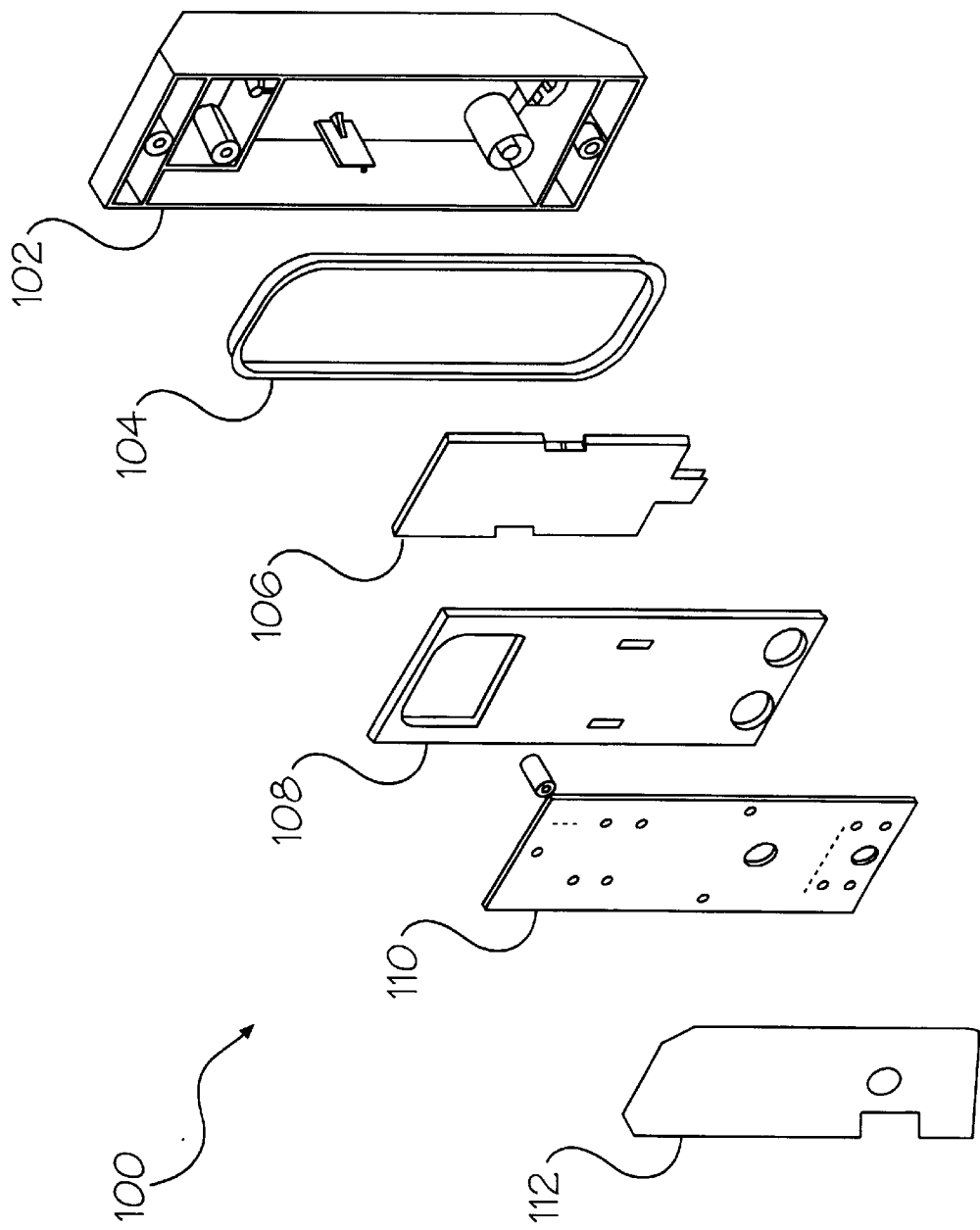
FIG. 1 is a an exploded assembly perspective of the RFID reader of the invention.

Referring first to FIG. 1, there is shown an exploded, perspective view of the inventive RFID reader, generally at reference number 100. A reader housing 102 covers an antenna 104. Antenna 104 surrounds an antenna inner filler 106. An antenna top sponge filler 108 separates antenna 104 from a printed circuit board 110. A pre-compensation metallic plate 112 is placed directly behind printed circuit board 110. Pre-compensation inner plate 112 is typically made from aluminum sheet stock and cut to a size that fits inside the back side of the reader housing 102. When testing reader 100, this inner compensation plate 112 must be placed in its exact, final location to ensure that its proximity is properly sensed by an antenna self-resonating circuit (not shown). Pre-compensation plate 112 in effect becomes part of the antenna resonating circuit. The pre-positioning of this inner compensation plate 112 allows for a pre-loading of the antenna self-resonant circuit. The subsequent mounting on a metal surface, such as a metal mullion, has a lessened, secondary effect on the antenna resonant circuit. It should be noted that the size of the inner plate 112 and the size of the metal mullion are critical to the effectiveness of this pre-compensation technique.

When trying to compensate the fringe effect of a large electromagnetic field, a high permeability ferrite tile (not shown) may also be used at the reader's mounting surface between the reader and the metal mounting surface. This ferrite tile presents a low impedance path for the electromagnetic flux. The magnetic flux is thereby diverted from the energy absorbing metallic material by the ferrite tile which completes a flux field loop away from the metal object.

If the electromagnetic flux field enters a metallic material, it generates a large circulating current (i.e., eddy current). This eddy current absorbs the energy of the electromagnetic field and causes the field to collapse. Without the ferrite plate or similar magnetic shunt structure, the reading range of a typical reader may be reduced to 5 or 6 inches, from a nominal 24 inches, when mounting on a steel door. By introducing a ferrite plate, the nominal reading range may be extended to approximately 20 inches.

Long-range and short-range RFID readers are typically mounted in different ways. Short-range RFID readers are typically mounted on metal mullions, while long-range readers are more often mounted on a metal wall or steel columns. The differences in their respective mounting environments necessitates two different compensation techniques to retain their respective reading ranges.

In both short-range and long-range RFID readers, the reading range relies on good matching of the antenna drive frequency with the antenna's self-resonant frequency. That means when the antenna drive frequency is 125 kHz, the antenna's self-resonant frequency must also be 125 kHz. A close frequency match establishes the maximum electromagnetic field of surveillance (i.e., the largest reading range). When an RFID reader is mounted on a metal door frame, the closeness of the metal may decrease the antenna's effective inductance. This detunes the resonant circuit which causes an upward shift of its self-resonant frequency. Because the antenna drive signal frequency is unaffected by the metal mass, this frequency shift results in a mismatch of the antenna drive frequency and the antenna's self-resonant frequency.

Detuning of the output resonance frequency can be pre-compensated by the introduction of metallic, pre-compensation inner cover plate 112 at the back of the reader 100. The introduction of plate 112 minimizes the effect of the metal mullion or other proximate metallic objects. Without plate 112, the reader's effective reading range may suffer a 50% reduction when the reader is mounted on a metal mullion or the like. By introducing plate 112, the reading range decrease is limited to approximately 10% when the reader is similarly mounted.

Long-range RFID readers, typically used for portal or gate control, are generally mounted on metal walls, metallic fences or a heavy-gauge steel columns or posts. The presence of these larger metallic masses causes a de-tuning of the resonant circuit and, often, a total collapse of the electromagnetic field. Large metal masses generally induce large amounts of eddy current which absorb the energy from the electromagnetic field thereby causing the field to collapse. This field collapse from induced eddy currents can not be prevented by simple, pre-positioned piece of metal (e.g., pre-compensation plate 112) close to the antenna coil 104. However, substituting high permeability materials, such as mumetal, ferrites, etc., for aluminum in metal cover plate 112, between the reader and the metallic mass can help. In addition, the placement of a ferrite tile between the reader and the external metallic mass, as described hereinabove, provides a low-impedance path for the electromagnetic flux. The ferrite tile confines the electromagnetic flux, thereby channeling the flux from the loss-generating metallic mass.

This ferrite tile, in cooperation with high permeability back cover plate 112, produces two benefits: first, using the ferrite tile improves the reader performance from an expected 70% degradation in reading range in prior art readers to less than an approximately 15% reading range degradation on the RFID reader of the present invention; second, the electromagnetic field shape is maintained and controlled in front of the reader, providing uneven, directional distribution of the electromagnetic field, confining the field on the side of the reader without the ferrite plate (i.e., the front). This shapes the field, forming a directional antenna which also enhances the reader's reading range.

While the influence of the mounting surface is an important installation challenge, operating voltage and current draw requirement are also important. This is especially true for long-range readers. Long-range readers typically operate at higher powers (relative to short-range systems) to establish a larger electromagnetic field of surveillance (reading range). Long-range RFID readers of the prior art typically require 24 volts and draw approximately 1.7 amps. This requirement creates two problems: the size (gauge) of the supply line copper wire, and the need for a special 24V power supply merely to power the RFID reader.

Most access control systems use a control panel to store identification codes and to control the opening and closing of gates or doors. All control panels in the industry are designed to provide 5 VDC at about 1.5 Amps and 12 VDC at about 800 mA. When installing a reader that requires 24V at 1.7 Amp, the installer must use a separate power supply and place this power supply as close as possible to the reader to minimize the Ohm's law (I/R) current/resistance drop in the copper wire. For example, a typical reader installation requires #22 AWG wires for signal and power, and the maximum distance between the power source and the reader can be 500 feet. For a standard mullion mount reader that draws 80 mA, the line drop across the 500 ft of #22 wire is (16.14 Ohms×0.08 Amp) or 1.3 volts. This means that the 5V power supply will supply only 3.7 volts at the reader's input terminal. The need to design an RFID reader capable of operating a low and varying input voltage becomes obvious. This voltage and current requirement problem becomes even worse when extended range RFID readers are considered. Typical prior art extended range RFID readers require 24V at 1.7 Amps. This means that even when #18 AWG wire is used, at 500 feet the line drop is 10.8 Volts (6.385 Ohms×1.7 Amps), leaving only 13.2 Volts (24–10.8) at the reader's input terminal!At this input voltage, most RFID readers are unstable at best and, worst case, are totally inoperable. The long-range RFID readers of the present invention are designed to work with input voltages ranging from 3.5 VDC to 12 VDC. They are also designed to work with #22 AWG wire at distances up to 300 feet. In addition, either a 5 VDC or a 12 VDC supply may be used interchangeably.

The frequency stability of RFID readers may also be affected by the manufacturing process, particularly potting operations. Potting is typically used to hermetically seal the antenna and the electronic circuitry within reader 100. Sponge fillers 106, 108 provide the antenna coil 104 with a consistent and reliable barrier between the antenna coil 104 and the potting compound (not shown). In addition, top sponge filler 108 locates the antenna coil 104 at a maximum and controlled separation from the printed circuit board 110. This controlled separation also maximizes reader 100 performance. Top sponge 108 also retains the antenna 104 in the bottom of the housing compartment 102. Filler sponge 106 fills the void in the center of the antenna coil 104 for additional positional stability. Once potted, both the printed circuit board 110 and the antenna coil 104 are totally isolated from the outside environment.

Low frequency (125 kHz, etc.) RFID systems rely on reader-to-transponder (not shown) resonant coupling to transfer energy from the reader 100 to the transponder, and from the transponder back to the reader 100. Transponder circuits are well known to those skilled in the art and form no part of the instant invention. Any known transponder circuitry may be used with the inventive RFID reader. Energy transferred from the reader 100 to transponder may be used to energize the transponder electronics to start the back-scattering process. When the transponder circuit is in resonance with the electromagnetic field, it absorbs substantially all of the electromagnetic field's energy. However, when the transponder circuit is not in resonance with the frequency of the electromagnetic field, little or no energy is absorbed. This means that the transponder circuit either absorbs or reflects (ignores) the electromagnetic field, depending on the state of the resonance of the transponder circuit. This absorption and reflection process can be detected by the reader. That is how an ID code or other information is transferred from the transponder to the reader 100. Once energized, the transponder IC selectively de-tunes this resonant coupling to change the degree of absorption and degree of reflection of the electromagnetic field sent out by the reader 100. The reader 100 senses these reflections and decodes the resultant time-varying of reflections into intelligible data.

Overall RFID system performance depends mainly on reader performance and, to a lesser extent, to transponder performance. Because there are numerous constraints that limit the design freedom on a transponder, the reader must be flexible and tolerant in its performance. For example, antenna coil 104 is typically designed to have a less than ±1% tolerance on its inductance value. Likewise, the resonating capacitor is also controlled to better than ±1% in its capacitance value. The resultant self-resonating frequency, typically approximately 125 kHz for short-range readers, is maintained to within approximately ±1% accuracy. This self-resonating frequency must match that of the reader's excitation frequency, which is usually derived from a crystal controlled oscillator. Once the antenna circuit is resonating at the desired frequency, the reader performance is optimized. Matching between the reader output self-resonant frequency and the readers excitation frequency is therefore a major determining factor in reader performance. This accuracy must be maintained during both the production and operational phases of the reader's life.

During the production phase, the only factor that may change the accuracy of the reader's self-resonating frequency is the potting process. Three factors in the potting process influence the reader's self-resonating frequency: the mixing ratio of the potting compound, the blending process, and the rate of cure. Most potting materials are two part epoxy compounds, each with a different dielectric constant. Mixing ratio and blending processes directly influence the ultimate dielectric constant of the final, cured potting compound. Furthermore, when the fluid compound comes in contact with the air core antenna coil 104, it starts to impregnate the coil winding 104, the amount of impregnation depending on the cure time. Since all of these processes are hard to control, the best possible measure to maintain consistency is to separate the antenna coil 104 and the potting compound (not shown) and to ensure that the antenna coil 104 and the potting compound do not come into contact with each other.

As previously mentioned, the inductance value of the antenna coil 104 is generally controlled to within ±1% and the capacitance of the resonating capacitor is controlled to a similar tolerance. Minute shifts in inductance value result in loss of electromagnetic field strength, which results in reading range degradation. The inventive design of FIG. 1 provides a simple means to set up the self-resonant circuit. Once the resonant circuit is tuned, the potting and curing process do not significantly change the self-resonant characteristics of the reader antenna circuits.

Since potting will not change the self-resonating frequency of the reader antenna circuit 104, a metal pre-compensation back plate 112 provides a repeatable way to compensate for metal masses upon which reader 100 may be mounted.

Figure 2:
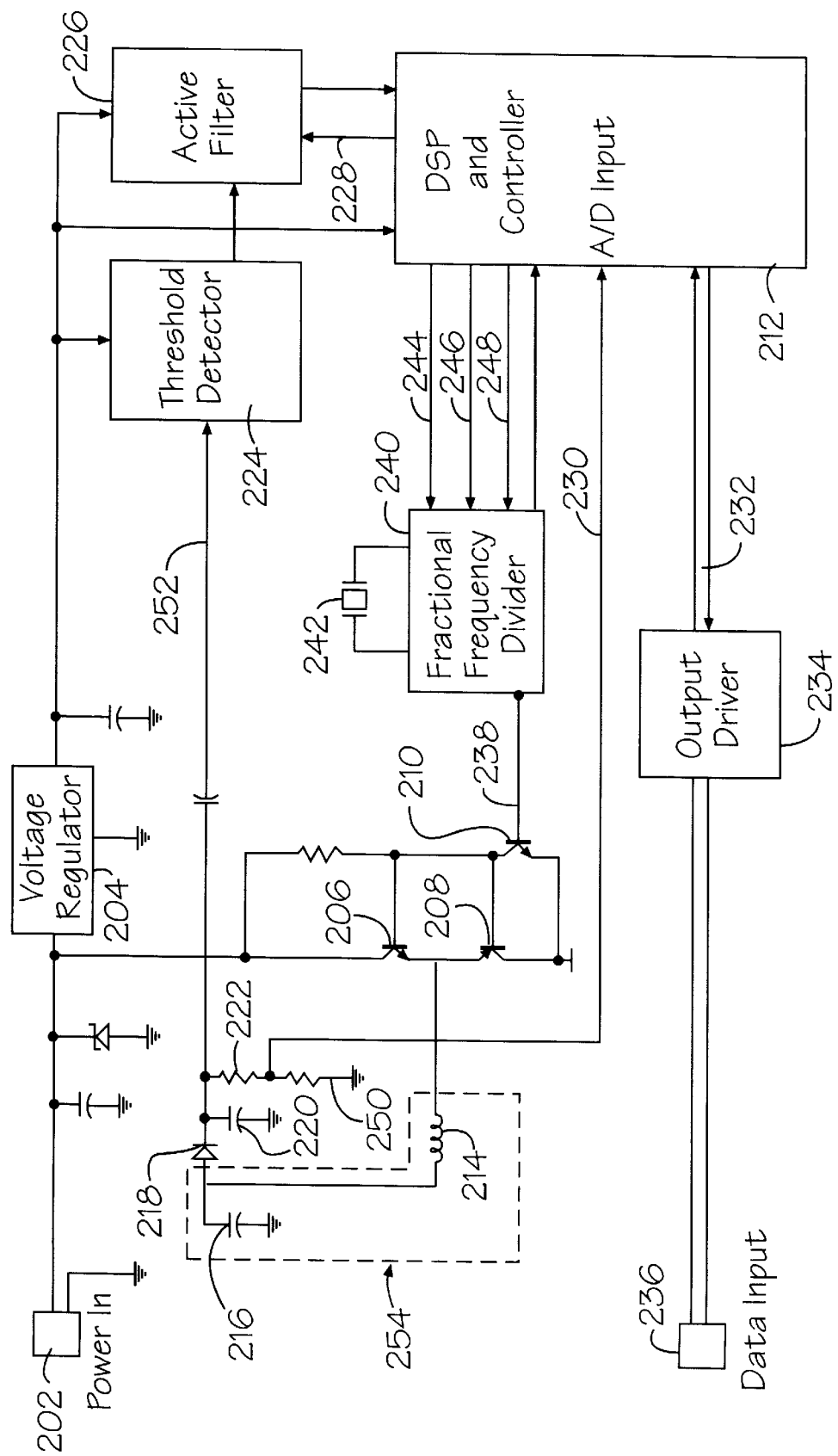
FIG. 2 is a schematic circuit diagram of the RFID reader of the invention.

Referring now to FIG. 2, there is shown a simplified schematic circuit diagram of the inventive RFID reader, generally at reference number 200. An input power connector 202 allows the application of a supply voltage to the circuit. The input voltage is regulated by regulator circuit 204 before it is applied to the remainder of the reader's circuitry. Transistors 206, 208, in combination with pre-driver transistor 210, form an output drive circuit (i.e., antenna driver). A fractional frequency divider (FFD) 240, in combination with crystal 242, form a programmable frequency generator providing a variable-frequency output signal 238 to pre-driver transistor 210. FFD 240 is controlled by digital signal processor (DSP) 212 via control lines 244, 246, 248. Driver circuit transistors 206, 208 amplify the output signal from pre-driver transistor 210 and provides the amplified signal to the antenna resonant circuit 254 which consists of inductor 214 (the actual antenna coil) and resonance capacitor 216. Diode 218, capacitor 220 and resistor voltage divider 222, 250 form a detector circuit which provides a feedback voltage 230 to DSP 212. Voltage divider 222, 250 is required because the detected voltages may be quite high (e.g., 300–800 volts DC) and must be reduced significantly to a level suitable for application to an A/D input on DSP 212. These types of control voltages are typically in the range of 2.5 volts.

The detected signal 252 is also applied to threshold detector 224 which provides an output signal applied to an active filter 226. Active filter 226 provides an output signal which is applied to DSP 212. The characteristics of active filter 226 may be controlled by DSP/controller 212 through a control line 228.

DSP 212 provides four functions: data formatting, error detection/correction, signal processing/detecting, and system control functions. All functions are provided in firmware implemented in DSP 212. DSP 212 processes the input from active filter 226 and provides a serial output signal 232, typically in "Wiegand" format, which is passed to an output driver 234 and then to data output connector 236.

In operation, FFD 240, under the control of DSP 212, provided a nominal frequency output of 125 kHz. The signal is amplified and applied to the resonant circuit 254 consisting of antenna inductor 214 and resonating capacitor 216 which generates an electromagnetic field. Because the antenna 214 may have been installed close to a metallic object, the resonant frequency resonant circuit 254 may have been detuned, generally because of a downward shift in inductance of antenna inductor 214, thereby raising the resonant frequency. In addition, temperature variations may also shift the resonant frequency of resonant circuit 254. Regardless of the reason, as the resonant frequency shifts, feedback signal 230 changes and DSP 212 compensates by changing the frequency of drive signal 238 by re-programming FFD 242.

The implementation of FFD 242 allows its output frequency to be changed in very small increments. Traditional frequency divider implementations provide only integral divisions of a crystal frequency. For example, if an 8 MHz crystal frequency were selected and the frequency divider set to a ÷64 mode, the resulting frequency would be 125 kHz. If, however, the increment were changed to a ÷63 mode, the output frequency would be 126.984 kHz, a change of almost 2 kHz. This situation may be improved by raising the crystal frequency. However, even raising the crystal frequency, for example, to 160 MHz and dividing the frequency by 1280, the resulting frequency is 125 kHz. Changing the divisor to 1279, the output frequency is 125.09773, a minimum step size of 97.73 Hertz!

While a 97.73 kHz step size is an improvement of the almost 2 kHz step size of the first example, the is not acceptable, especially in long-range RFID readers which typically use antenna resonant circuits having very high "Q" and very sharply defined tuning curves. To overcome this minimum step size, a new class of inexpensive integrated circuit fractional frequency dividers has been used. These devices allow a divisional fractional division of their outputs, typically by 1/8 or 1/16. In the previous example, a 160 MHz crystal was divided by 1280 to achieve a 125 kHz nominal output frequency. It was demonstrated that the minimum frequency step was 97.73 Hertz. By specifying a fraction of the step (e.g., 15/16, 14/16, etc.) these devices allow the minimum increment to be reduced to 6.1 Hertz, an increment small enough for use even in long-range RFID readers. A chip found suitable for this application in the catalog number LMX2350 manufactured by National Semiconductor.

It should be obvious that other operating frequencies may be chosen to meet a particular operating requirement or environment and the invention is not considered limited to the operating frequencies chosen for purposes of disclosure. It should also be noted that there are many other frequency control methods, well known to those skilled in the circuit design arts, which may be suitable for use in the inventive circuit. Such methods include stable voltage-controlled oscillators (VCOs) and integer dividers in combination with a phase-locked loops or direct digital syntheses (DDS). Also, in alternate embodiments of the inventive circuit, feedback voltage 230 may be derived in ways other than from a voltage divider. For example, current draw from the power supply could be monitored.

Regardless of the implementation technology, the inventive system is designed to optimize RFID reader performance by compensating for manufacturing, installation and operating temperature variations by maintaining an oscillator frequency continuously matched to the resonant frequency of the antenna inductor 214 and its associated resonance capacitor 216.

As has been discussed hereinabove, the RFID transponders are designed with either a self-contained power supply or with means to derive their power from the electromagnetic field. Once energized, these transponders generally operate by back-scattering their IDs on a continuous basis. This means that the RFID reader receives a continuous transmission of an ID code without clear starts or stops in the data stream. Because of this operating mode, the probability of a data error becomes progressively higher as the data length becomes longer. To overcome this high error potential, the inventive RFID reader/transponder system transmits a data length preamble and recurring parity bits. This both declares the data length and provides intermediate parity checking throughout the data transmission.

It has been found that the parity bit for every three data bits give early warning of data corruption without having to wait for the end of the data stream and a CRC or other such data integrity check. It has been found that a parity bit for each three bits of data optimize the data reception reliability. In the preferred embodiment, an odd parity bit has been used. It will be obvious to those skilled in the art of serial data transmission that other data-to-parity bit arrangements and/or even parity could also be used to meet specific operating requirements.

In addition, a triple redundancy requirement is placed on the data reception (i.e., there must be three identical receptions of the data) before the incoming data is accepted as valid. The inventive system works with 26-bit through 52-bit data lengths and may be dynamically programmed to operate at any intermediate data length.

Another feature of the inventive RFID receive is its ability to automatically adapt to automatically detect an external access control panel. Because the inventive RFID system must interface with multiple, diverse types of third-party systems, this feature allows for easy installation because there is no need to know whether an access control system requires a logic high or low for "LED Red" (i.e., standby or access denied) status. The inventive RFID reader may automatically conform its output to the requirements of the external access control system.

Since other modifications and changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by letters patents is presented in the subsequently appended claims.

What is claimed is:

1. A radio frequency identification (RFID) system, comprising:

a) an RFID reader generating an electromagnetic field at a predetermined frequency, said RFID reader having sensing means that interfaces with an external access control system for sensing a data polarity requirement of said external access control system, and to configure an output of said RFID system to conform to said polarity requirement, said RFID reader further comprising pre-compensation means for substantially eliminating changes to an RF field caused by influences of metal proximate said RFID reader; and b) an RFID transponder that interacts with said electromagnetic field of said RFID reader, said RFID transponder containing an ID code associated therewith, and wherein said RFID transponder has means for disrupting said electromagnetic field of said RFID reader, whereby said ID code is transmitted to said RFID reader as a data stream comprising a preamble of imbedded data and at least two data bit groups, each of which has a parity bit.

2. The radio frequency identification (RFID) system as recited in claim 1, wherein each of said data bit groups comprises three data bits.

3. The radio frequency identification (RFID) system as recited in claim 1, wherein said data stream is dynamically alterable to a length of between approximately 26 and 52 data bits.

4. The radio frequency identification (RFID) system as recited in claim 1, wherein said RFID reader comprises automatic configuration means to sense at least a data polarity requirement of said access control system, and to configure an output of said RFID system to conform to said requirement.

5. The radio frequency identification (RFID) system as recited in claim 1, wherein said predetermined frequency is dynamically alterable in response to at least one condition from the group: changing a parameter of a component within said RFID, changing temperature, changing an external metallic mass.

6. The radio frequency identification (RFID) system as recited in claim 5, wherein said predetermined frequency is dynamically alterable in discrete steps.

7. The radio frequency identification (RFID) system as recited in claim 6, wherein said discrete steps are less than approximately 10 Hz.

* * * * *